United States Patent [19]

Crump, Jr.

[11] 4,247,757
[45] Jan. 27, 1981

[54] VEHICLE FUEL ECONOMY ENERGY CONSERVATION INDICATING DEVICE AND PROCESS FOR USE

[76] Inventor: John M. Crump, Jr., 1018 Parkridge Circle West, Jacksonville, Fla. 32211

[21] Appl. No.: 908,016

[22] Filed: May 22, 1978

Related U.S. Application Data

[63] Continuation-in-part of Ser. No. 861,965, Dec. 19, 1977, Pat. No. 4,186,296.

[51] Int. Cl.³ .................. G01M 15/00; G06G 1/14
[52] U.S. Cl. .................................... 235/615; 73/114
[58] Field of Search .............. 235/61 J, 61 B, 61 R; 73/114

[56] References Cited

U.S. PATENT DOCUMENTS

| | | | |
|---|---|---|---|
| 1,479,873 | 1/1924 | Schroeder | 235/61 J |
| 1,555,413 | 9/1925 | Gronkwist | 235/61 J |
| 1,690,328 | 11/1928 | Gardeen | 235/61 J |
| 2,268,549 | 1/1942 | Kennedy | 73/114 |
| 2,522,299 | 9/1950 | Redue, Jr. | 235/61 J |
| 2,723,642 | 11/1955 | Manning | 73/114 |
| 3,549,868 | 12/1970 | Watson | 73/114 |
| 3,983,372 | 9/1976 | Klaver | 235/61 J |
| 4,020,683 | 5/1977 | Young | 73/114 |
| 4,186,296 | 1/1980 | Crump, Jr. | 235/61 J |

*Primary Examiner*—L. T. Hix
*Assistant Examiner*—Benjamin R. Fuller

[57] ABSTRACT

A vehicle fuel economy energy conservation indicating device and process for use comprising an integrated instrument cluster functioning basically as a continuous computing mechanism. The speedometer distance traveled indicator mechanism is articulated with the fuel consumed indicating mechanism utilizing proportional and cooperable alignment elements such that a three variable equation computing mechanism is obtained. The three variables are distance traveled, quantity or fuel consumed and distance traveled per unit of fuel consumed. Fuel economy and energy conservation are achieved by operating the vehicle under such performance conditions as to produce the highest possible value for distance traveled per unit or fuel consumed. This device brings the operator's attention to focus upon fuel economy resulting in stimulation to conserving energy and achieving maximum fuel economy. Furthermore, the vehicle energy conservation indicating device is optionally adapted for recording these performance variables on a memory chart. The speedometer is optionally positioned concentric to the distance traveled indicating instrument and fuel indicating instruments with the fuel economy and energy conservation indicating device centrally located within these two conventional instrument indicators.

Thus, this direct visual indication of actual fuel economy will stimulate and influence the operator to exercise planned management to achieve effective maintenance and efficient driving pattern habits. This device becomes the visual target point of the instrument panel along with the speedometer, thereby providing constant motivation to achieve maximum fuel economy by controlling two of the most influential factors effecting fuel economy: Vehicle maintenance and vehicle operator driving habits.

12 Claims, 8 Drawing Figures

| | 1 | 2 | 3 | 4 | 5 | 6 |
|---|---|---|---|---|---|---|
| | MILES PER GALLON | HORSEPOWER DEMAND HOURS PER MILE | CITY VS. HIGHWAY SPEED VS. TIME ACCELERATION/ DECELERATION | NUMBER COLD STARTS PER MILE | PASSENGER CARGO LOAD POUNDS | TIRE PRESSURE PSI |
| 1 | 35 | | | | | |
| 2 | 34 | | | | | |
| 3 | 33 | A0 | B0 | C0 | D0 | E0 |
| 4 | 32 | | | | | |
| 5 | 31 | | | | | |
| 6 | 30 | A1 | B1 | C1 | D1 | E1 |
| 7 | 30 HIGHWAY | A2 | B2 | C2 | D2 | E2 |
| 8 | 30 | A3 | B3 | C3 | D3 | E3 |
| 9 | 29 | | | | | |
| 10 | 28 | | | | | |
| 11 | 27 | A0 | B0 | C0 | D0 | E0 |
| 12 | 26 | | | | | |
| 13 | 25 | A4 | B4 | C4 | D4 | E4 |
| 14 | 25 CITY | A5 | B5 | C5 | D5 | E5 |
| 15 | 25 | A6 | B6 | C6 | D6 | E6 |
| 16 | 24 | | | | | |
| 17 | 23 | | | | | |
| 18 | 22 | | | | | |
| 19 | 21 | A0 | B0 | C0 | D0 | E0 |
| 20 | 20 | | | | | |
| 21 | 19 | | | | | |
| 22 | 18 | | | | | |

VEHICLE FUEL ECONOMY ENERGY CONSERVATION INDICATING DEVICE AND PROCESS FOR USE

This application is a continuation in part of my co-pending U.S. application Ser. No. 861,965 filed on Dec. 19, 1977.

BACKGROUND OF THE INVENTION

With the advent of EPA automotive fuel mileage ratings, HR6831 "The National Energy Act", Public Law 94-163 mandating minimum fuel economy standards for automobiles, and increasing costs, it becomes both logical and desirable to accommodate the vehicle operator with an instrument that indicates vehicle fuel economy. To accomplish the requirements of indicating fuel mileage economy, such as vehicle average miles per gallon, sufficiently accurate with a compact arrangement of components, a computing mechanism for solving miles per gallon equal miles divided by gallon is required. Such a mechanism constitutes the subject of this patent application which is a continuation-in-part of my co-pending U.S. application for a vehicle energy conservation indicating device and process for use, Ser. No. 861,965 filed on Dec. 19, 1977 now, U.S. Pat. No. 4,186,296 which also disclosed certain embodiments of such a computing mechanism. More than any other product of technology the road vehicle is the focus or unresolved conflict arising from the limited energy resources. The average vehicle consumes its own weight in fuel each year, about 700 gallons, totaling over 28 percent of the petroleum consumption in the United States Fuel economy is a complex function or many factors such as (1) power plant performance including accessories, (2) aerodynamic drag, (3) tire resistance, (4) inertial mass, (5) driving pattern and habits, and (6) length or trip and environmental conditions including ambient temperature, humidity, wind direction and force, terrain (level or hilly). Of these six categories of factors the vehicle operator has it within his power to control and/or influence all factors excluding environmental and original vehicle design characteristics. Vehicle maintenance and operator driving habits are two of the most important factors influencing fuel economy.

By way of illustration it is interesting to note that a 20 percent decline in fuel economy on a typical vehicle rated at 20 miles per gallon and consuming 700 gallons of fuel per year at rated mileage economy, would result in a loss of 175 gallons of fuel at a cost of $105, using $0.60 per gallon fuel in March 1978 which has increased 100 percent to $1.20 per gallon in March 1980. Simple mathematics based on $0.60 per gallon fuel and 100 million vehicles gives an estimated total of $17.5 billion gallons, valued at some $10.5 wasted in one year. This is the equivalent of a train or tank cars approximately 20,714 miles long.

Another important consideration in vehicle fuel economy is keeping the operator informed of the actual day to day fuel economy being experienced with each specific vehicle-operator combination. The key link between vehicle performance and energy conservation is the vehicle operator. In order to conserve energy the operator must be aware of his vehicle fuel economy performance relative to rated fuel economy. It is obvious, therefore, that to achieve meaningful economy and conservation on a continuing basis a need exists for the improved vehicle fuel economy and energy conservation indicating device of the present invention.

OBJECTS AND SUMMARY OF THE INVENTION

The fuel economy and energy conservation indication device of the present invention has among its objectives the creation in a single economical design a combination of construction, methods and procedures whereby average fuel economy can be monitored, indicated and recorded in a manner conducive to highly motivate prompt operator attention to those factors influencing fuel economy and energy conservation. Accordingly, the present invention permits more efficient use of the existing conventional vehicle instruments, namely the speedometer-odometer and fuel indicating instruments whereby the speedometer-odometer instrument components are located concentric with respect to the fuel indicating instrument components thereby allowing for the articulation necessary to produce a continuously acting computing mechanism. The computing mechanism establishes a relationship between three parameters $$DPG = UWP \text{ divided by } FC$$

Where DPG is the performance efficiency, generally measured in units of useful work performed per unit of fuel consumed. UWP is useful work performed, generally measured in units of distance traveled miles. FC is fuel consumed, generally measured in units of gallons.

Further objectives reside in the integrated arrangement of components relative to the speedometer indicating pointer and the operator's binocular field of vision. It is the ultimate objective of the present invention to motivate the operator to take prompt and timely action regarding vehicle maintenance and driving habits in order to achieve maximum rated vehicle fuel economy on a continuing basis. To achieve this, the present invention will create in the operator a central motive state that is persistent and responsible for emitting a behavior pattern directly related to the stated ultimate objective or maximum fuel economy.

Another objective is to provide optional memory devices that will provide a numerical counting record of significant and highly influential operator driving pattern characteristics. A simple counting device is used to record the number of times the vehicle is cycled through a predetermined speed. Said predetermined speed having a definite relationship to rated fuel economy and power plant performance. For example, the counter device could count the number of times the vehicle is accelerated thru 30 mph and also the number of times the vehicle passed thru 55 mph. Thus, by the inclusion of two simple inexpensive and proven reliable counting mechanisms a record of significant operator driving habits is obtained for correlation with the actual fuel economy observations.

It is further proposed, and optionally provided for, that a numerical counting device be provided to record the "operator's horsepower demand" which would complement the integrated instrument cluster providing an index to operator speed-versus-time sequence of driving pattern habits. Thus, the vehicle fuel economy and energy conservation indicating device together with the peripheral numerical counting components provide fundamentally simple, reliable and economical instruments to facilitate, reinforce and complement the entire spectrum of vehicle operation and maintenance activities thereby creating the essential elements for an effective conservation management program.

The process and procedure for utilization of the present invention can be illustrated by a delineation of the optional methods and combinations of installation with the basic vehicle fuel economy and energy conservation indicating device. The following features are optional:
 (1) fuel economy memory in the form of permanent record
 (2) fuel consumed memory numerical counter
 (3) operator horsepower demand memory numerical counter
 (4) acceleration cycles memory numerical counter
 (5) exceeded preset speed memory numerical counter
 (6) optionally located, nested with speedometer or separately, and
 (7) optional positions of fuel indicator pointer and fuel economy indicator relative to vehicle speed indicator.

The vehicle fuel economy indicator utilized in conjunction with a vehicle maintenance and operation driving habit pattern guide will provide an effective energy conservation management program. Based upon the premise that the vehicle upon purchase by the owner-operator is, in fact, appropriately adjusted to deliver the rated fuel economy it follows of necessity, that from that time forward three fundamental factor categories influence vehicle fuel economy. These factor categories are (1) operator driving habit pattern, (2) operator vehicle maintenance program management, and (3) environmental factors including ambient air temperature and geographic road terrain. Clearly two factors which fall under the practical control of the owner-operator are operator driving habits and operator vehicle maintenance management.

Using the vehicle fuel economy indicator as a fundamental feedback and diagnostic tool, a successful energy conservation management program can be implemented. Comparison of the following feedback data with appropriately tabulated data in the customary vehicle owner-operator's manual will identify and provide a memory record of the vehicle-operator's performance. The vehicle fuel economy indicator including all optional features will provide the following feedback data:
 (1) number of vehicle starts per operated mile
 (2) percentage of highway miles versus city miles
 (3) operator horsepower hours demand or speed versus time demand characteristics
 (4) number of times vehicle exceeds maximum speed set point
 (5) actual memory record of miles per gallon
 (6) total fuel consumed
 (7) average fuel economy can be ascertained at any time by dividing total miles by total fuel consumed
 (8) operator horsepower hours per gallon of fuel.

The vehicle fuel economy indicating device as described in this invention will through its synergistic characteristics provide the fundamentally necessary vehicle-operator performance feedback data to achieve a successful energy conservation management program at a cost savings to the owner and a resource saving to the country. Furthermore, the subject invention 100 has basic useful application in the event of a serious national fuel supply emergency. Most states conduct vehicle safety inspections which require, among other things, evidence of insurance. These same inspection agencies could require evidence of adequate energy conservation management. The memory record features of the subject invention provides such evidence. Since most energy consuming devices employ analogous instruments to the road vehicle, it is fully contemplated that the subject invention can be adapted to such applications and its use is not limited to road vehicles. For instance, applications where the fuel economy is measured in gallons per ton mile of useful work, gallons per ton hours of useful work and other similar measurements of useful work performed. For cybernetic and visual perception consideration, the vehicle fuel economy indicator can be placed in a separate instrument apart from the vehicle speed indicator and the two interconnected by suitable means to transmit the distance traveled input parameter.

The present invention and optional embodiments thereof create a synergistic effect wherein the cooperative action of the fuel consumed indicator combined with the distance traveled indicator produce a total effect greater than the sum of the effect taken independently.

It is instructive to point out the variations of arrangements and combinations of related parts that may be obtained while at the same time retaining the fundamental novel and useful features of this invention. These variations and option are listed by the following categories:
 1. The fuel economy and energy conservation indicator may be located separate from the speed indicator depending upon instrument cluster space arrangement and visual perception considerations.
 2. The integrated instrument may include any one or more of the following peripheral indicators:
    A. operator horsepower demand totalizer
    B. vehicle speed versus time pattern counter
    C. fuel consumed totalizer counter
    D. trip distance counter
    E. total distance counter
    F. vehicle exceeds maximum allowable speed counter.
 3. The related construction features may be varied from a totally concentric hollow shaft type movement with input drive means direct shaft driven to a concentric shaft with pinion gear or cam gear input drive means. These variations in construction features provide for desirable flexibility in arrangement of parts to facilitate a variety of instrument cluster physical geometry characteristics.
 4. The vehicle fuel economy indicator may be optionally provided with a chart memory recorder utilizing one of several marking techniques as follows:
    A. heated stylus with heat sensitive chart material
    B. ink tip pens
    C. pressure sensitive paper with scribe type stylus
    D. elongated graphic marker scribe
    E. combination of illuminated and heated stylus
    F. galvanometer needle marking trace
    G. electromagnetic or electrostatic storage
    H. pressure sensitive chart with galvanometer needle making closely spaced series of dots which appear as a continuous trace.
    Chart material may further be sectionally coated with appropriate coatings to produce contrasting trace colors to indicate when the actual fuel economy is within or outside rated limits.
 5. The vehicle fuel economy indicating device may further be optionally provided with a fuel indicator potentiometer for combined input to fuel consumed totalizer counter means and/or proportional reset means for partial or full fuel tank replenishment.

6. The vehicle fuel economy indicator dial and associated construction, when integrated with the vehicle speed indicator, may be rotated concentrically relative to the speed indicator dial to achieve various advantageous visual preceptive positions. The embodiment illustrated shows the fuel consumed indicator dial concentric and centered with the speed indicator dial thereby illustrating one arrangement whereby the vehicle operator has his visual attention focused upon both speed, fuel and economy simultaneously. Thus the end result is enhanced motivation toward achieving fuel economy.

7. The vehicle fuel economy indicator device may be optionally constructed without fuel consumed and distance traveled indicator dial. Said dials being installed on the instrument panel in the conventional manner. The memory chart may be driven from the distance traveled input drive suitably reduced in speed to provide chart speed corresponding to indicator visual field size whereby a predetermined memory span is always displayed for comparison. From a construction viewpoint it is interesting to observe that the synergistic characteristics produce an integrated instrument cluster substantially equal in simplicity to convention instrument panels therefore providing the much needed vehicle fuel economy indicators at substantially no additional cost. The above objectives, and others as well, will be more fully apparent from the following specifications and the accompanying drawings which for purposes of illustration depict preferred embodiments.

8. Adjustable magnetic reed switches may be located on the vehicle fuel economy indicating scale arranged such that the indicating pointer will activate the magnet, close the switch and give a visual or audio indication that fuel economy is below rated limits.

Figure 1:
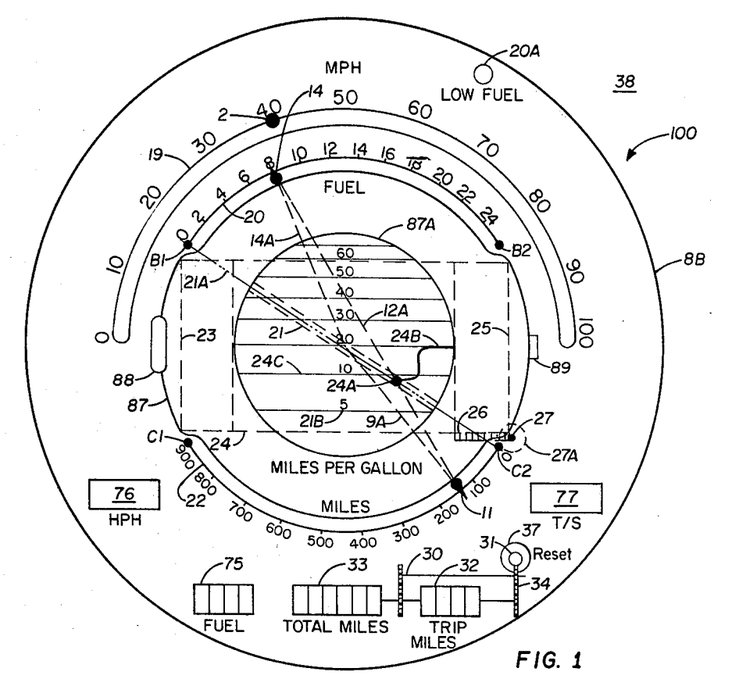
FIG. 1 is a front plan view of one embodiment of the vehicle fuel economy and energy conservation indicating device as observed from the vehicle operator's center of vision field.
Figure 2:
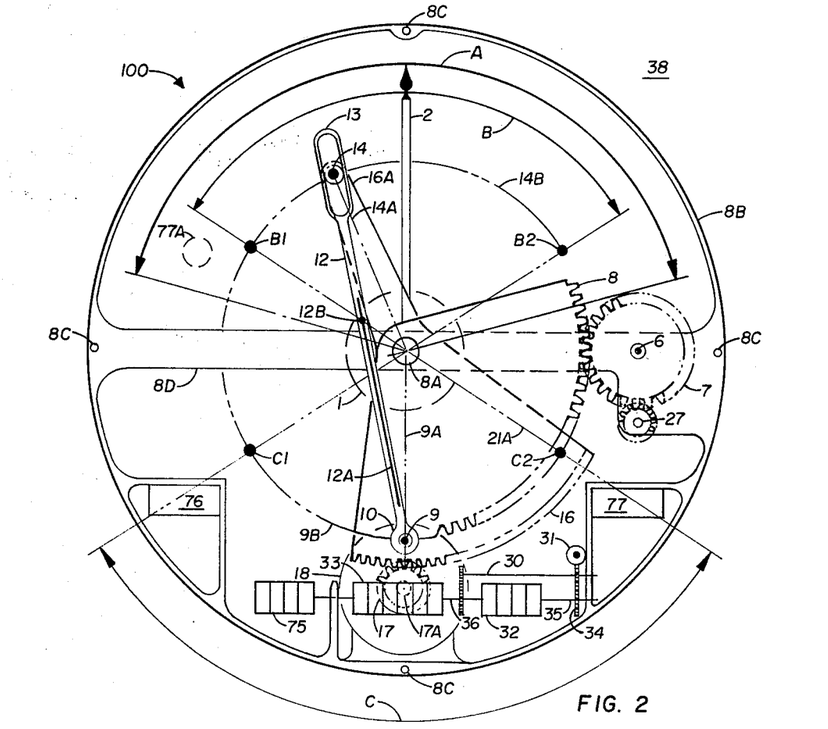
FIG. 2 is an operational plan view of the integrated vehicle fuel economy and energy conservation computing mechanism.
Figures 3, 4, 5:
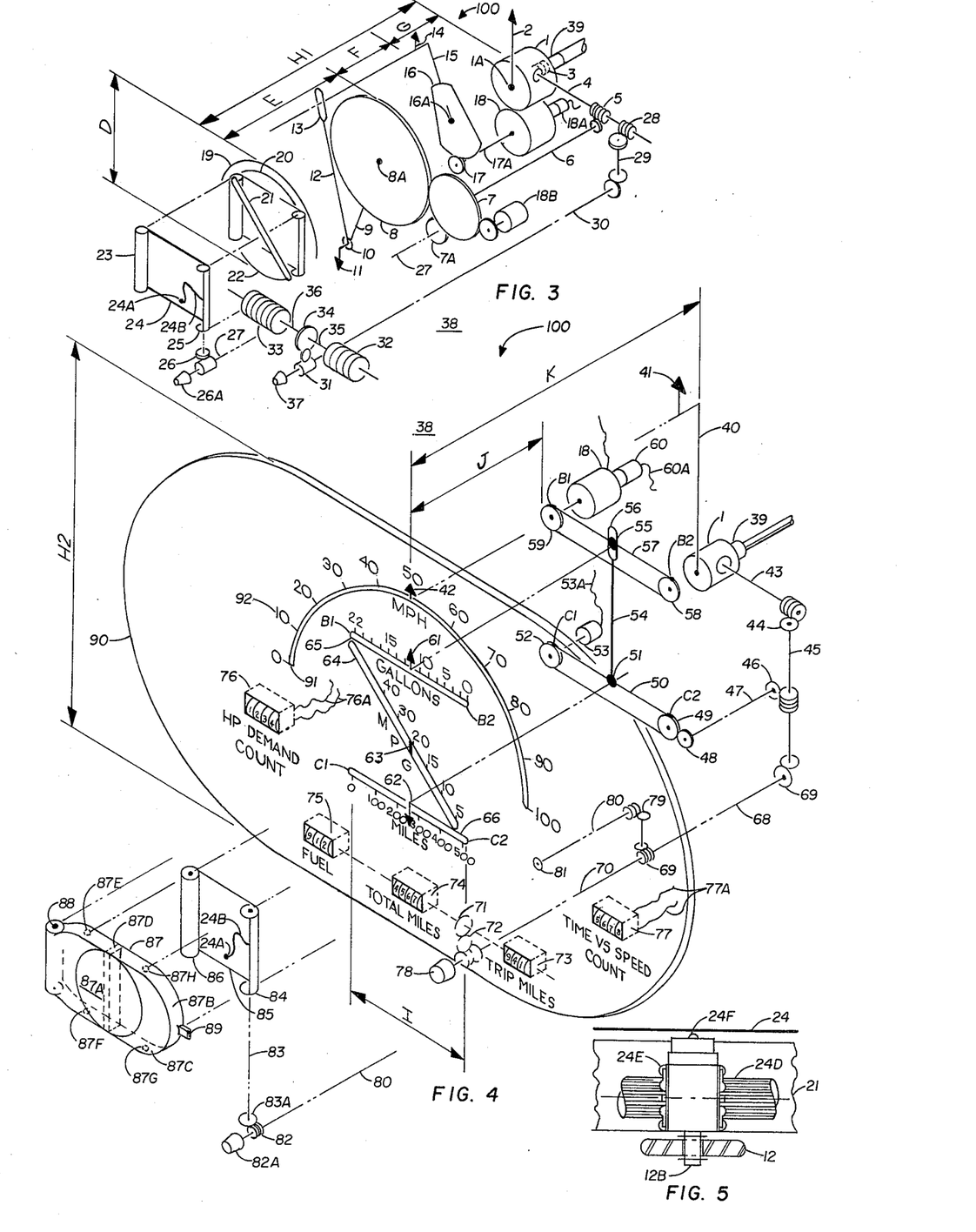
FIG. 3 is a perspective view schematically illustrating more clearly in exploded format the concentric function mechanism arrangement.
FIG. 4 is a perspective view schematically illustrating more clearly in exploded format the parallel tape function mechanism arrangement together with the complete array of associated and related counting elements.
FIG. 5 is a fragmentary large scale view of memory chart recording means.
Figure 6:
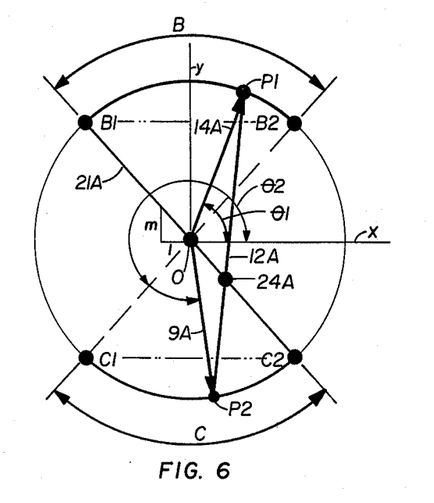
FIG. 6 is a graphic schematic showing the mathematical relationship for the circular sector functional arrangement.
Figure 7:
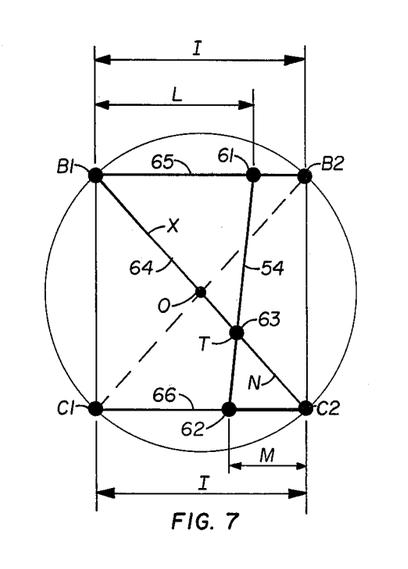
FIG. 7 is a graphic schematic showing the mathematical relationship for the rectangular similar triangle functional arrangement.

Referring to the drawings and more particularly to FIGS. 1, 2, and 3, a concentric circular sector functional arrangement embodying the mathematical relationship schematically illustrated in FIG. 6. Specifically the cooperable element of the mechanism are characterized by a concentric circular physical geometry. It should be noted, however, that the physical geometry in its disclosed form is not to be considered as a limitation on the scope of this invention, rather it has been selected merely as an example to illustrate more clearly the operating features and principles of this invention. It is to be observed that FIG. 4 shows a modified rectangular functional arrangement embodying the mathematical relationship schematically illustrated in FIG. 7. Furthermore, it is more specifically noted that the fundamental functional characteristics are generic to either arrangement as schematically illustrated in FIGS. 6 and 7. The significant features of the construction described is particularly suitable for an unlimited range of different physical size devices thereby facilitating the ease of incooperating into any conventional vehicle instrument panel.

DETAIL DESCRIPTION

Referring now specifically to the drawings and first to FIGS. 1-4, there is shown a vehicle fuel economy and energy conservation indicating device embodying features of the present invention, generally designated by the referenced numeral 100, which includes a generally arcuated housing 8B having enclosed therewith a plurality of particular subassemblies involved with the embodiment of the present invention. For purposes of clarity and ease of description, the overall vehicle fuel economy and energy conservation indicating device construction in a typical installed environment will first be described, then the particular subassemblies involved with the embodiment including certain necessary particulars of various elements thereof, and finally followed by a description of the preferred embodiments for vehicular utilization.

The housing 8B may be of any shape or configuration compatible with the receiving instrument panel 38 including curved portion thereof at different levels to form part or all of a vehicle instrument arrangement. However for simplicity of description the vehicle fuel economy and energy conservation indicating device 100 and its body 8B are shown as being of the generally circular configuration having substantially symmetrical and concentric construction features identified by the referenced numerals 8B 19, 20, 22, 87 and 87A in FIG. 1 and generally of the elongated eliptical configuration having substantially symetrical and parallel construction features identified by referenced numerals 50, 57, 65, 66 and 90 in FIG. 4.

Without attempting to limit to particular dimensions, but in the interest of informing the public, the dimensions designated as A, B, C, D, E, F, G, H1, H2, I, J and K in FIGS. 2, 3 and 4 may be systematically determined for integration into a wide variety of vehicle instrument panels 38. Therefore, the vehicle fuel economy and energy conservation indicating device illustrated in its disclosed forms is not to be considered as a limitation on the scope of this invention, which disclosed by way of example, the principle of the invention and the preferred modes of applying that principle to achieve broad adaptability to the generic nature of vehicle instrument panel 38.

The broad theory of the vehicle fuel economy and energy conservation indicating device of this invention is shown in FIGS. 2 and 3 wherein a fuel economy indicating means 12 is operably and functionally communicated between a distance traveled indicator pointer shaft pivotal means 9 and a fuel consumed indicator pointer shaft pivotal means 14. Fuel economy functional movement or computing indicator means 12 has a longitudinal centerline 12A intercepting the circular arcs 9B and 14B each respectively being generated by the vectors 9A and 14A rotating about concentric pivot shaft 8A.

Distance traveled functional movement or computing element 8, shown here for example as a sector gear, is operably driven by the speedometer flexible shaft drive 39 (see FIG. 3) and a conventional speedometer 1 with worm gear drive means 3 driving transducer shafts 4 and 6 thru shaft transducer takeoff 5 with movement element 8 being driven by transducer interface gear 7, as shown on FIGS. 2 and 3.

Fuel consumed functional movement or computing element 16, shown here for example as a sector gear, is operably driven by the fuel consumed measuring means 18 which is preferably one of a variety of electromagnetic devices, such as variable reluctance and permanent magnet stepping motors, transforming electrical inputs to mechanical form either in continuous of discrete increments of rotary motion at gear 17. This fuel consumed measuring means 18 performs two functions in response to a fuel consumption electrical input signal representation of the measured fuel consumed (FC). The electrical signal input representation, generally a series of discrete electrical pulses proportional to volume of fuel consumed (FC) by the vehicle are transformed by the electromagnetic device 18 to provide a measure of total cumulative fuel consumed (FC). This process generally referred to as totalizing and scaling. The construction of fuel consumed measuring means 18 and speedometer device 1 do not in themselves form a part of the present invention except in relation to the means for integrating the same into the distance traveled and fuel consumed functional elements 8 and 16.

It is instructive to teach the characteristics of Speedometer 1 as it relates to the input information to device 100. Speedometer 1 is driven by a shaft 39 usually connected to the vehicle transmission gear train which has ratios taken into account tire sizes and axle ratios. Shaft 39 rotates a permanent magnet that is positioned near a speedcup internal to Speedometer 1 and thus not shown. The revolving magnet sets up a rotating magnetic field that pulls the speedcup and its attached miles per hour pointer 2. A hairspring keeps the speedcup steady and causes it to come to rest where the hairspring balances the force of the revolving magnet. Device 100, subject of this application, does not use the speedometer as input to the average fuel economy computing device.

Also driven by Shaft 39 is odometer device 32 and 33 for registering the total distance traveled by a vehicle. In this case device 32 is a trip odometer that can be reset to zero when fuel is replenished in the fuel tank or at the beginning of a trip.

Thus, speedometer 1 is an interesting example of both analog and digital computation. The speed (rate, velocity, distant traveled per unit of time) of the vehicle, indicated by pointer 2 is measured by an analogous physical quantity, namely the rate of rotation of the main drive shaft. Since speed is the mathematical derivative of the distance traveled with respect to time, the analogous measuring process consists of differentiation. However, Shaft 39 also provides input to odometers 32 and 33 which measure distance traveled by counting or adding the number of revolutions completed by shaft 39. Note that this important feature provides a means for continuous measurement of a *physical quantity* analogous to the input in the functional relationship of the present invention 100.

As described, the rotation of Shaft 39 represents both speed and distance traveled. Speed is distance traveled in a certain time and usually expressed $$\text{Speed (average)} = \frac{\text{distance covered}}{\text{time required}} = \frac{\text{miles}}{\text{hour}}$$

This can also be expressed as $$V(\text{Velocity}) = \frac{S}{t} \text{ or } \frac{\Delta S}{\Delta t}$$

which is the usual average velocity since it is total distance divided by total time. However, speedometer 1 indicates something entirely different called "instantaneous velocity" and expressed as $$\text{Instantaneous Speed} = \frac{\text{Infinitesimal distance covered}}{\text{Infinitesimal time required}}$$

where infinitesimal means smaller than anything that can be measured (a well known concept in Calculus). Unlike instantaneous fuel economy devices which utilize speed as the input, the device 100 of the present invention uses *distance traveled* as the input parameter.

Thus device 100 computes $$\text{Average Fuel Economy} = \frac{\text{Total Distance Traveled}}{\text{Total Fuel Consumed}}$$

Referring to FIG. 2, it is instructive to teach the following optional arrangement (not shown) for connecting fuel consumed measuring means 18 to vehicle fuel economy indicator means 12. Fuel measuring means 18 may be concentrically located with shaft 8A and by constructing shaft 8A in a tubular cross section the shaft 17A may be communicated through said tubular shaft 8A and subsequently connected to fuel consumed pivot means 14 by a lever arm generally extending from shaft 17A along line 14A to pivot means 14.

Referring to FIG. 2 observe that arc 14B extending from point B1 to point B2, identified by sector notation b, describes the functional movement limits for fuel consumed indicator pointer means 14. As illustrated in FIG. 1 the point B1 corresponds to "zero fuel consumed" and point B2 corresponds to "fuel tank empty" on fuel consumed dial 20. Thus the illustrated fuel consumed dial 20 conveys to the vehicle operator the information as to how much fuel has been consumed rather than how much remains in the storage tank. Indicating light 20A warns the operator of low fuel supply condition. Observe how in FIG. 2 that arc 9B extending from point C1 to point C2 identified by sector notation C, describes the functional movement of distance traveled indicator pointer means 9. As illustrated in FIG. 1 the point C1 corresponds to "maximum distance traveled indication" and point C2 corresponds to zero distance traveled on distance traveled dial 22.

From FIG. 1 it will be observed in FIG. 2 that the straight line 21A intercepting points B1, C2 and the geometric center of shaft 8A, constitutes the longitudinal centerline for the vehicle fuel economy indicating dial 21. A straight line 12A intercepting the geometric centers of pivotal means 9 and 14 will also intercept heretobefore said straight line 21A. It is precisely the interception of straight line 12A with straight line 21A that computes the vehicle fuel economy. It is convenient to define the operation and computational features of the fuel economy indicator using more precise rigors of mathematics. The functional relationship may be expressed as follows:

F (X) = vehicle fuel economy, miles per gallon
F (Y) = distance traveled, miles
F (Z) = fuel consumed, gallons Where it is well known that F (X) = F (Y) divided by F (Z)

which is also called average miles per gallon not to be confused with instantaneous miles miles per gallon.

Referring to FIG. 6, it can be shown using mathematics that 21A, 14A, 9A and 12A are straight lines having equations in the following form:

$X = r \cos \theta$ $R = x^2 + y^2$ $Y = r \sin \theta$ $\theta = \tan^{-1} y/x$ line 14A intercepts arc B at P1 and line 9A intercepts arc C at P2. Thus the line 12A passing thru points P1 and P2 uniquely determines a point 24A on line 21A and it is this unique point 24A which is the solution to F (X) = F (Y) divided by F (Z). Therefore, by inspection of FIG. 6 it is evident that for each and every combination of points P1 on arc B and points P2 on arc C that a straight line 12A connecting any two point P1 and P2 uniquely determines a corresponding point 24A at the intersection of line 12A and 21A. It may be further demonstrated that the theory underlying the computation methods associated with the present invention, and more clearly shown on FIG. 6, depends also upon the simple properties of similar triangles or similar circular sectors, for example, triangle P1, 24A, B1 similar to triangle P2, 24A, C2. Referring to FIG. 6, it can be shown using analytical geometry that in addition to the more conventional rectangular coordinate system, for defining points on a plane surface such as best observed in FIG. 7, that the polar coordinates of points P1 and P2 may be expressed as follows. Let P1 be a point on the plane surface contained within the circle passing through points B1, B2, C1, C2, P1 and P2. Then P1 O is the line segment from P1 to the origin O further identified by reference numeral 14A. The polar angle $\theta 1$, of the point P1 is the angle which P1 O makes, measured in a counterclockwise direction from the X axis. P1 = (X, Y) then consider the angle $\theta 1$. Then $\tan \theta 1 = y$ divided by x, hence $\theta 1 = \arctan$ (y divided by x). This then is the polar angle of the point given by $\theta 1 = $ arc tan y divided by x. Since P1 = (x, y) the polar radius of the point P1 is the distance from P1 to the origin. Hence, the distance from O to P1 designated by 14A is 14A — square root of x squared plus y squared. These polar coordinates thus defined may be transformed to rectangular coordinates by X = 14A $\cos \theta 1$ and Y = 14A $\sin \theta 1$.

The domain of interest is points P1 on the arc B and points P2 on the arc C. Thus the equation 14A squared equals X squared plus Y squared defines a circle whose radius is the distance 14A and whose values for X and Y extend from the origin O to the points B1 and B2. A similar argument may be presented for points P2 whose radius is 9A and whose values for X and Y extend from the origin O to the points C1 and C2. It should be noted, however, that the type of display dial face in its disclosed form is not to be considered as a limitation on the scope of this invention. Rather it has been selected merely as an example to illustrate more clearly the operating features and principles of the invention. In this regard it is instructive to point out that reference designation 21A in FIG. 6 and reference designation 64 in FIG. 7 may take on a variety of curved shapes depending upon the functional characteristics of input parameters P1, P2 in FIG. 6 or reference designations 61 and 62 in FIG. 7. Thus the corresponding physical features of FIGS. 1, 3 and 4, namely the fuel economy registration scales 21 and 64, may be any shape necessary to satisfy the three variable equation F(X) = F(Y) divided by F(Z). Referring now to the embodiment in FIG. 4 where distance traveled functional movement or computing tape 50 is shown engaged with fuel economy functional movement or computing indicator means 54 at pivotal trunnion element 51 and fuel consumed functional movement or computing tape 57 is shown engaged with fuel economy indicator means 54 by means of pivotal trunnion element 55 and elongated slot 56. The distance traveled function movement tape 50 together with the fuel consumed function movement tape 57 are respectively and uniquely positioned relative to the distance traveled indicator scale 66, fuel consumed indicator scale 65 and fuel economy scale 64. It is important to observe that indicator scales 65 and 66 may be optionally eliminated in which case the predominate display data becomes the fuel economy indication on scale 64 at reference designation 63. According to the mathematical theory, appropriately displayed in FIG. 7 by graphical example, the line 65 corresponds to fuel consumed indicator scale 65 (FIG. 4) and line 66 corresponds to distance traveled indicator scale 66 (FIG. 4). Line 64 corresponds to vehicle fuel economy indicator scale 64 (FIG. 4). The remainder of the numeral designations in FIG. 7 correspond respectively in FIG. 4 to the vehicle fuel economy indicator means 54 and its related distance traveled trunnion element 51, fuel consumed trunnion element 55, the extent of said scales designated at points B1, B2, C1 and C2 further identified as length I. Therefore, having established the graphical method of FIG. 7, with its one-to-one correspondence with the specified corrdinates of FIG. 4, and the heretobefore designed mathematical functions F (X), F (Y) and F (Z) giving us the equation F (X) = F (Y) divided by F (Z) where (Y) is a function of distance traveled and F (Z) is a function of fuel consumed. Having chosen the two parallel axes B1, B2 and C1, C2 oppositely directed, with the diagonal line B1 C2 being of a convenient length K related to instrument panel dimensions H and I (FIG. 4). With B1 and C2 as origins established along these respective axes the locations X = MIFI(Y) and Y = M2 F2(Z) for successive values of Y and Z. For the present case these axes are merely calibrated for distance traveled and fuel consumed.

On B1 B2 select a point 61 at any convenient distance, L, from B1; compute auxiliary modulus, N, by the formula N=LMI divided by M2 where MI and M2 are size moduli associated with parallel axes B1 B2 and C1 C2 which in turn relate to reference I in FIG. 4. Establish along B1 B2 an auxiliary scale X'=NF1(T) for successive values of T (not shown), Marking each point temporarily with the corresponding value of T. Transfer this auxiliary scale to the transverse axis B1 C2 by means of projecting lines drawn through the point 61, marking each point permanently with the corresponding value of T. Thus the T scale along B1 C2 is completed. Furthermore the points along B1 C2, the distance x from B1 to a point labeled T, will be given by the equation x=KMIF3(T) divided by MIF3(T)+M2 which upon examination will be recognized as the relationship between similar triangles which may be observed as (L) divided by (M) equals (B1 C2 minus N) divided by N which is the relationship between triangles (B1, 61, 63) and (C2, 62, 63).

Referring to FIG. 4, fuel economy indicating means 54 is shown mounted for articulated movement about trunnion elements 51 and 55. Movement tape 50 is linear between the points C1 and C2 describing a straight line between points C1 and C2 generally tangent to pulleys 49 and 52 at these said points. Movement of distance traveled function input terminal pulley 49 is obtained by means of distance traveled input element 48 being driven through distance traveled drive element 47 and transmitting elements 46, 45, 44 and 43. Movement tape 57 is linear between the points B1 and B2 describing a straight line between points B1 and B2 generally tangent to pulleys 58 and 59 at these said points. Movement of fuel consumed function input terminal pulley 59 is obtained by fuel consumed measuring means 18. Fuel consumed measuring means 18 may be any one of a variety of conventional electromagnetic devices transforming electrical signal representations of a fuel consumed measurand into mechanical form including variable reluctance and permanent magnet stepper motors, balancing motor with helipot potentiometer or other similar devices. Fuel consumed measuring device 18 is optionally interlocked with distance traveled tape pulley 52 by means of electromagnetic reset means 53 and interconnecting electrical conductors 60A and 53A thereby providing for proportional reset of distance traveled indicator pointer 62 whenever fuel consumed indicator pointer 61 is reset. Position transducer 60, which is mounted for engagement with drive means 18, provides operative means for resetting distance traveled function movement tape 50 simultaneous with resetting of fuel consumed function movement tape 57 in conjunction with fuel tank (not shown) refueling operations. With this construction dimensions J and K may be held to a minimum thereby facilitating the efficient installation of speed indicator pointer shaft 40 and indicator pointer 41 into final assembled position identified by reference numeral 42.

Trip miles counting means 73 together with total miles counting means 74 are memory and storage devices for totalizing and accumulating a series of discrete events referred to as trip miles normally associated with that distance traveled when consuming a single tank full of fuel. Any one of a variety of counters, preferably of the mechanical or electromechanical type, used in concert with the fuel economy indicating device 100 as illustrated in FIG. 4 and being driven by distance traveled counting pinion 71 which is further operably engaged to the speedometer 1 through drive elements 70, 69, 68, 67, 45, 44 and 43. Manual reset knob 78 provides means for resetting the trip miles counter 73 and distance traveled movement tape 50 shown engaged through drive elements 48, 47, 46 and 67. The construction of the counter devices 73, 74, 75, 76 and 77 do not in themselves form a part of the present invention except in relation to the means for accumulating, storing and totalizing the hereinbefore described vehicle operating characteristics which substantially present those elements of numerical data necessary for a process of utilizing the subject invention 100 in a prescribed energy conservation management program. Fuel consumed counter 75 is preferably electrically interconnected (not shown) to fuel consumed measuring means 18 thereby providing an accumulated total gallons of fuel consumed which provides a direct check of average fuel economy when divided into the distance traveled miles counter 74 readout. Horsepower demand counter 76 is preferably electrically interconnected through conductors 76A to a transducer (not shown) located between the vehicle accelerator pedal (not shown) and the vehicle carburetor (not shown). For each and every accelerator position there corresponds a vehicle horsepower rating. Thus the counting device 76 functions basically as a horsepower hour counter. Therefore, in relation to the process of utilizing the subject invention 100 in a prescribed energy conservation management program the actual horsepower hours counted, when compared with rated horsepower hours per unit of distance traveled, reveal the operator's driving habits as measured at the accelerator pedal (not shown).

The operator horsepower hour demand counter 76 is essentially an electric motor whose speed of rotation is proportioned to circuit power and where total angular displacement is a measure of time integral of power. The circuit power being varied in response to the operator's operation of the accelerator pedal.

The time versus speed counter 77 is preferably electrically connected through conductors 77A to a motion proximity sensing device 77A (FIG. 2) positioned relative to speedometer indicator pointer shaft 2 (FIG. 2) or indicator pointer 40 in FIG. 4. The sensing device 77A is located relative to speed indicator scale 91 and such that each time the vehicle is accelerated through that speed a count is registered on counter 77. The speed counter point is preferably established at a speed preset to correspond with efficient fuel economy, for example 30 miles per hour.

Therefore, the process of utilizing the subject invention 100 includes the memory storage of how many times the vehicle has been accelerated from substantially zero speed to a speed corresponding with minimum recommended speed for maximum fuel economy. Furthermore, it is instructive to teach that a sensing element could be positioned at 55 miles per hour and the counter so connected to include one count each time the speed exceeds say 55 miles per hour. The energy conservation management procedure includes the provision that rated fuel economy would be correlated with rated counts over a prescribed test road section for both operator horsepower demand 76 count and time versus speed count 77. A prescribed road test procedure similar to SAE J 1082 is discussed herein after in regard to the operator horsepower demand counter and a fuel economy rating matrix. SAE J 1082 defines observed economy as the fuel economy measured during a driving cycle and is determined by dividing the actual miles driven on the cycle by the number of gallons consumed and expressed as miles per gallon. These optional energy conservation management devices are simple in construction, economical, and provide for data accumulations essential to an overall procedure of utilization which recognizes the special interest of vehicle operator, manufacturers, maintenance, and/or repair personnel, and subsequent purchasers of used vehicles. Referring to the drawings and particularly FIGS. 1 and 4, there is shown a memory chart cartridge which is formed by housing 87. Housing 87, which is preferably formed of a light weight plastic material, includes a sidewall 87B continuous around the periphery of face wall 87C. As shown on both FIG. 1 and FIG. 4, the cartridge 87 is operably pivoted to dial face 90 by means of hinge 88. The cartridge is releasably supported by latch means 89 in a closed position with dial 90. A supply of memory chart 85 is disposed on spool 86 within the cartridge housing 87 and further pivotally engaged with pivot means 87E and 87F. The memory chart 85 is preferably one of a variety of heat sensitive materials, specially coated papers, pressure sensitive materials or carbon paper backed materials adaptable to the plurality of optional memory recording techniques. The cartridge housing 87 has a takeup spool 84 rotatably mounted herein the same manner as shown for the supply spool 86. Memory chart 85 extends from the supply spool 86 parallel with the surface of dial face 90 passing over and in contact with memory recording means 63, shown in FIG. 4. Observe that referenced numerals, 24A in FIGS. 1 and 3, 12A in FIG. 2, 63 in FIG. 4 and 24F in FIG. 5, identify elements of the present invention having substantially the same functional purpose of either presenting a visual nonrecorded or a visual and recorded indication of vehicle fuel economy 24A. In this regard it is instructive to teach that device 54 in FIG. 4 may be located physically in front of memory chart 85 and the recording means 24E (FIG. 5) suitably adapted with guide members 87D (FIG. 4). The recording means 24E, illustrated in FIG. 5, shows the vehicle fuel economy indicator means 12 operably engaged with recording means 24E at stud 12B with memory chart 24 in contact with scribing means 24F. Thus, according to the construction features of the present invention fuel economy indicator means 54, shown in FIG. 4, can be adapted to either record on the rear surface or the front surface of the memory chart paper 85.

As the memory chart 85 passes over fuel economy indicator scale 64, shown in FIG. 4, the fuel economy indicator means 54 causes an indication of fuel economy to be recorded on memory chart 85 shown by reference numerals 24A and 24B. At the same time a stud, rod or spindle 83 engages with the cylindrical passage within takeup spool 84. When the cartridge housing 87 is in the latched closed position a drive gear 82, rotatably mounted with drive means 80 is driven through drive elements 79 and 69 which in turn are suitably engaged with the speedometer I through drive elements 68, 67, 44 and 43. The drive mechanism thus described causes takeup spool 84 to be rotated a variable angular amount corresponding and proportional with the vehicle distance traveled. Therefore, the drive means for more precise definition is driven not by the speedometer 1 but by the speedometer drive shaft 39 thereby measuring distance and not speed. The proportional feed rate of memory chart 85 passes the fuel economy indicator means 12A and is suitably reduced in speed such that memory record 24B clearly shows trend movements in view window 87A (FIG. 4). Considering the operation of the present memory chart device comprised of elements 84, 85, 86, 87, 88, 89 and subcomponents thereof, illustrated in FIGS. 1 and 4, it is entirely expedient to package the chart 85 and spools 84 and 86 into a cartridge such that the vehicle operator or authorized vehicle maintenance personnel may easily replace spent cartridges. Furthermore, the memory chart spool cartridge, illustrated in FIG. 1, comprised of referenced numerals 23, 24 and 25 (illustrated in FIG. 4, comprised of referenced numerals 84, 85 and 86) may be utilized to analyze and diagnose performance characteristics 24B after the cartridge is removed from the vehicle fuel economy indicating device 100. Referring to FIG. 1, there is shown a form of the present invention 100 as viewed by the vehicle operator within the binocular visual field. The visual target is a visual field generally contained within the space defined by instrument housing 8B. Chart 24 may be provided with numbered fuel economy graduation lines 21B. As discussed hereinbefore, the purpose of the subject invention has as one of its primary objectives the conservation of energy through the voluntary action of individual consumers. Therefore, with subject invention 100 the individual vehicle operator is provided with an integrated visual stimulus target contained within instrument housing 8B. As previously described the fuel scale 20 and distance traveled scale 22 may be rotated to any desirable position relative to speed scale 19. Also, the present 100 is not limited to a circular arrangement illustrated in FIG. 1 but may have any desirable ratio of height H to width I dimension as shown in FIG. 4. Hence, the following description is entirely applicable to the invention regardless of its specific geometrical shape. In FIG. 1 there are basically three visual zones within the visual target field. Zone 1 is generally that sector between fuel scale 20, the outside limits generally defined by housing 8B and speed indicator O on the left hand side and speed indication 100 on the right hand side. It is the intent of the embodiment, thus shown, to have zone 1 visually stimulate the operator by the relative positions of speed indicator pointer 2 versus fuel consumed indicator pointer 14. The integrated conscious response and interpretation of the zone 1 visual stimulus situation is that "the higher the speed rate 2 the higher the fuel consumption rate 14". Fuel scale 20 in this illustration being registered to show gallons consumed. Zone 2 is that area contained within generally the circle defined by reference numeral 87A having displayed therein the vehicle fuel economy indication 24A and memory record 24B in those situations having this memory record optional feature. It is the intent of the embodiment, thus shown, to have zone 2 visually stimulate the operator to achieve and maintain greatest possible value for vehicle distance traveled per unit of fuel consumed. The operator will be provided a total stimulus visual target whereby the results of driving patterns are reflected in the vehicle fuel economy indication 24A. In those situations using the memory chart recorder indication 24B an additional management tool is provided in terms of three fundamental categories: (1) effects of operator driving patterns are reflected in the memory record trend line 24B, (2) the memory record provides a tool for performance analysis and diagnosis, (3) a record will be provided of the number of times the vehicle is stopped and started using the ignition switch key (not shown). When the ignition is turned off the fuel indicator 14 can assume either the position indicated as B1 or the position indicated as B2. In either case the motion of the fuel indicator 14, and hence fuel economy indicator 12A, will cause a "distinct signature trace" to be recorded on the memory chart 24 in FIGS. 1 and 3 (memory chart 85 in FIG. 4).

Zone 3 occupies the lower sector of the subject invention 100 generally confined between instrument housing 8B and distance traveled scale 22. There are eight basic functional elements optionally contained in zone 3: trip miles counter 32, trip miles counter reset 37, total miles counter 33, fuel consumed counter 75, operator horsepower demand counter 76, time versus speed counter 77, and distance traveled indicator 11.

In one embodiment as illustrated in FIG. 1 all eight basic functional elements have been shown. However, these various elements are optional and the basic fuel economy indicating device 100 is not dependent upon these elements. Also, it is important to point out that the basic fuel economy indicating device 100 may be located in an instrument housing 8B separate from the speedometer scale 19 and indicator 2. Furthermore, the subject invention fully contemplates a variety of physical arrangements such as three separate instruments forming an instrument panel cluster with one instrument containing the speedometer 1 and related distance traveled counters 32 and 33, a second instrument containing the vehicle fuel economy indicator 24A and a third containing related indicators designated by reference numerals 75, 76, 77, 20A and 14. Finally, the device 100 may also be utilized as an accessory or a hand held tool. Therefore, zone 3 elements constitute both conventional trip miles counter 32 and total miles counter 33 together with three additional counters to provide adequate vehicle and operator driving pattern data. The art of counters is well developed and a large variety of mechanical. Electromechanical and electronic devices are available on the market. Therefore, these devices do not in and of themselves comprise a part of this invention except in relation to their total integration into the subject invention 100. The process of utilizing the subject invention 100 embodies an energy conservation management program which recognizes three basic areas of responsibility: (1) vehicle maintenance, (2) operator driving patterns and habits, and (3) manufacturer's performance ratings.

Figure 8:
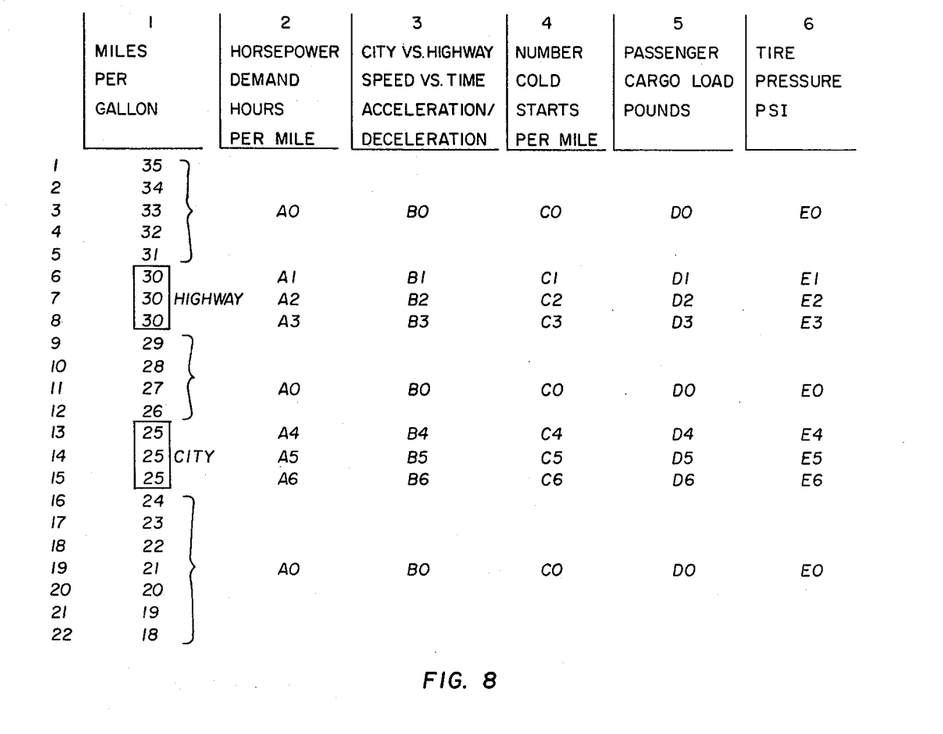
FIG. 8 is a data table showing a vehicle fuel economy rating matrix for use in an energy conservation management program.

One very desirable and preferred method of implementing the energy conservation management program is thru a vehicle fuel economy rating matrix such as that illustrated in FIG. 8 with four columns 1-4 and twenty-two lines 1-22. For purposes of clarity and ease of description the four columns will be described followed by a description of the various data appearing on lines 1-22 and concluding with necessary particulars of various elements thereof and its aid in carrying out the energy conservation methods and procedures of the present invention 100.

Column 1 is "miles per gallon". Column 2 is "horsepower demand hours per mile". Column 3 is "speed versus time sequence" or city vs highway or acceleration-deceleration sequence. Column 4 is "number of cold starts per mile".

Lines 6, 7, 8 and 13, 14, and 15 tabulate respectively the highway and city vehicle fuel performance ratings for a given standard driving pattern based on controlled testing performed by the manufacturer. Lines 1-5, 9-12 and 16-22 tabulate representative data such as range of values for columns 2, 3 and 4 which correspond to a given fuel rating in column 1. For the subject illustration lines 6-8, and 13-15 are the rated fuel economy performance data. The energy conservation management matrix illustrated in FIG. 8 would be placed both in the vehicle operating manual and if desired on the sun visor (not shown) or other suitable more exposed and readily accessible locations to the operator. A series of hypothetical situations will be described to illustrate the process of using the energy conservation management program. The program, from the operator's point of view, is quite simple, readily understandable, and requires only the capacity to read and locate numbers in a matrix tabulation such as the income tax rate tables, only much more simple and therefore more readily comprehended.

Situation 1: The vehicle operator under normal operating conditions has a continuous visual stimuli from the vehicle fuel economy indicator 24A. With the scale 21 or memory chart 24 appropriately noted by color coding the operator is made aware of vehicle performance relative to rated performance. When actual performance does not fall in the acceptable range the operator refers to the rating matrix of FIG. 8.

Situation 2: Vehicle performance occurs on lines 1-5. In this situation the vehicle's actual observed economy exceeds the rated economy thus the operator's driving pattern or habits are better than those for the rated performance. For instance, values for AO, BO, CO are all lower than the rated values A1, A2, A3, B1, B2, B3, C1, C2, C3. This could be a very light in weight operator residing in a very flat geographical location who never drives with anyone in the vehicle and with regularity drives a given distance using an optimum combination of engine starts.

Situation 3: Vehicle performance occurs on lines 9-12. In this situation the driving patterns are such that the values for AO, BO, CO exceed the rated values given on lines 6-8.

A similar discussion could be given for city rating lines 13-15 and subsequent lines 16-22. However, it should be apparent that if the operator locates the actual conditions reasonably close on a given line of the matrix of FIG. 8, he has thus identified and analyzed his problems. It is precisely the tabulated excessive driving habit pattern items of columns 2, 3 or 4 that are causing fuel economy performance below rated values.

Now, when is maintenance diagnosed as the required remedy to below rated fuel economy? Situation 4 will answer this question.

Situation 4: The actual fuel economy is given in column 1, line 20, but the driving pattern characteristics of columns 2, 3 and 4 are on line 8. Clearly then the operator is not at fault since the measured data of columns 2, 3 and 4, line 8, state that the vehicle economy should be 30 miles per gallon.

Maintenance is indicated as necessary.

Situation 5: Maintenance is performed as indicated under situation 4 followed by no improvement in fuel economy as indicated by memory chart record 24B. Clearly the authorized maintenance personnel have not performed the proper corrective maintenance.

Situation 6: The vehicle is sold or traded on a new vehicle. Memory chart 24 together with, or individually as the case may be, fuel counter 75 and total distance traveled counter 33 provide an "energy conservation signature record" for this vehicle reflecting the nature of care given the vehicle by the operator. Column 2 designated as horsepower demand hours per mile is a parameter reasonably easily obtained by placing a potentiometer type variable resister (not shown) between the accelerator (not shown) and the carburator (not shown): the horsepower hours demand counter 76 is basically an elapsed time indicator with variable speed drive mechanism connected to the potentiometer. The potentiometer would be calibrated in horsepower demand units since associated with each accelerator pedal position is a corresponding horsepower demand rating for the power plant. That is, for each setting of the fuel supply to the engine in response to a corresponding accelerator pedal setting, there is a corresponding capacity of the engine for the performance of useful work. Said useful work generally being defined as foot-pounds of torque available at the driven wheels or the conveyance of pounds of cargo over a given distance per unit of time. Therefore, while the subject column 2 parameter is not in the true scientific meaning an absolute measure of horsepower it is an absolute measure of the vehicle operator's demand for the equivalent of horsepower, for horsepower is precisely what a vehicle operator is commanding each and every time the accelerator pedal is activated. The vehicle may or may not respond to the operator's command. For instance, a vehicle heavily loaded with a house trailer in tow on a steep grade moving at a given speed and the accelerator setting will not produce more acceleration regardless of the operator's demand for more acceleration by further depressing the accelerator. Therefore, horsepower demand hour counter 76 in FIGS. 1 and 4 together with column 2 of FIG. 8 are indeed true measures of operator driving characteristics which have a significant effect upon fuel economy.

Column 3 designated as city versus highway, or speed versus time, or acceleration/deceleration is a measure of the number of cycle stops per mile and readily reveals if the driving pattern is city, highway, or average combination. Counter device 77 together with sensing device 77A provide the actual data as shown on FIGS. 1 and 4. Column 4, designated as number of cold starts per mile as a byproduct data item on memory chart 24 (FIG. 1) or memory chart 85 (FIG. 4). Each time the ignition is turned off the fuel consumed indicator 14 (FIG. 1) or 61 (FIG. 4) cycles to its off position thereby causing fuel economy indicating means 12A (FIG. 1) or 63 (FIG. 4) to so indicate this condition.

Columns 5 and 6 in FIG. 8 are tabulated data further defining certain significant parameters which influence fuel economy. Other columns could be added to indicate such items as accessory power, ambient temperature, passenger and cargo load and wind speeds.

In view of the aforedescribed vehicle fuel economy indicating device 100 operating characteristics, combined with the energy conservation management program illustrated in FIG. 8, the objectives of this invention 100 have been achieved. All in all, the features of this new invention bring forth an advancement in the art over prior known devices of this character.

It will also be recognized and appreciated that the utility and functional effectiveness of the subject invention will be enhanced by the appropriate combination of materials and contrasting colors. The visual target, best illustrated in FIG. 1, is the face of an instrument device 100 confined within a housing designated by reference numeral 8B. While there are a plurality of possibilities a preferred embodiment would include a black background for the entire face area exclusive of the area contained within the circle whose circumference is designated by reference numeral 87A. The circle area whose circumference is designated by reference numeral 87A is a transparent plastic material for clear viewing of the vehicle fuel economy indication 24A and 24B when the optional memory chart 24 is included therewith. Indicators 2, 14, 24A and 11 are orange for good contrast. Numerals for scales 19, 20, 21 and 22 are white. Thus there are three contrasting colors: black background with white numerals and orange indicator pointers. The invention 100 is adaptable to a variety of improved display techniques. Such additional techniques will be described for illustration. Display technique number 2 will include a light emitting diode in the center of shart 9, best shown in FIG. 2. Fuel economy indicator means 12 will be light transmitting material such as fiber optics or appropriately configured plastic polarizers. The results being a visual indication of fuel economy at 24A (FIG. 1) caused by light being emitted at 12A (FIG. 2). Fuel economy dial 21 (FIG. 1) is either an open slot thru which indication 24A is viewed or, in the case where optional memory chart 24 is utilized, 21 is a cooperating guide for memory recorder means 24E (FIG. 5). Display technique number 3 includes the utilization of a black absorbing layer behind a transparent light emitting film such that light emitting diodes at indicators 2, 14, 24A and 11, or a combination thereof, will give a visual indication of the respective parameters miles per hour, fuel consumed, vehicle fuel economy and distance traveled.

SYNERGISTIC CHARACTERISTICS

It has been pointed out that one of the objects of this invention was to provide the fundamentally necessary vehicle operator feedback performance data whereby a successful energy conservation management program can be achieved. For many years vehicle instrument panels have had a somewhat conventional construction comprising a plurality of instruments: speedometer, odometer, fuel gauge, alternator function, engine temperature, tachometer, and various headlight/turn signal indicator lights. The conventional vehicle instruments do not effectively place the vehicle operator in the closed-loop feedback control system with regard to fuel economy and energy conservation.

As hereinbefore described, and shown in FIGS. 1, 2, 3, 4, 6, and 7, subject invention 100 embodies two registering means diametrically disposed and designated by reference numerals 20 and 22 in FIG. 1 (analogous and related reference numerals 9B, 14B in FIG. 2, 20, 21 in FIG. 3, 65, 66 in FIG. 4, B, C in FIG. 6 and 65, 66 in FIG. 7) and further related to a third registering means transversely related to the two diametrically disposed registering means and designated by reference numeral 21 in FIG. 1 (analogous and related reference numeral 21A in FIG. 2, 21 in FIG. 3, 64 in FIG. 4, 21A in FIG. 6 and 64 in FIG. 7). The synergistic results are obtained by utilizing the two conventional physical measurements, distance traveled and fuel consumed, as input measurements to perform a computation fuel economy equals distance traveled divided by fuel consumed. The construction of the fuel economy computing device 100 is shown diagramatically in FIGS. 6 and 7. FIG. 6 relates to the embodiments depicted in FIGS. 1, 2 and 3 and FIG. 7 relates to the embodiment depicted in FIG. 4. It will be observed that the fundamental computing operation is the same although basic operating mechanism effectuating the driving of the computer elements are either radial about a concentric axis as in FIG. 6 or linear along two parallel axes as in FIG. 7. The computations performed according to $F(X)=F(Y)$ divided by $F(Z)$ For convenience the method of FIG. 6 will be described in detail with the understanding that the fundamental aspect applies equally to the method of FIG. 7. Two diametrically opposed registration scales designated by arcs B and C. The B scale with a modulus MB and the C scale with a modulus MC are located a selected distance D apart as shown in FIG. 3. The scales are graduated according to the equations $DC=MC\ F(Y)$ and $DB=MB\ F(Z)$ so as to proceed in opposite directions from a transverse line 21A. The fuel economy scale lies along line 21A from B1 to C2 with its origin at the origin C2 for the C scale. A straight line always connects three distinct values P1, P2 and 24A on the three respective scales. Thus the operable registering of distance traveled registering means at P2 simultaneously with fuel consumed registering means at P1 uniquely established fuel economy at 24A which results from the registration of 12A with 21A.

The distance P1 on the B scale is equal to the product of scale modulus and the value of the scale function $P1=MB\ F(Z^x)$ and $P2=MC\ F(Y^x)$ respectively. Corresponding sides of the similar sectors formed by the baseline 21A and arc length are in the same ratio $$\frac{P1}{P2} = \frac{B1C2 - 24A}{24A}$$

where P1 is measured from B1, P2 is measured from C2 and 24A is measured from C2 and B1C2 equals of transverse baseline 21A.

Substituting equivalent values for P1 and P2

$$\frac{MBF(Z^x)}{MCF(Y^x)} = \frac{B1C2 - 24A}{24A}$$

corresponding values of the variables are obtained by repeated substitutions in the equation. Thus by the combination of related elements shown in FIG. 2, further functionally articulated through registration means 12 together with registration scale 21 in FIG. 1, the fuel economy indicating device 100 is thereby obtained. With this simple, yet unique, mechanism the conventional speedometer and fuel gauge have been integrated such as to indicate vehicle fuel economy to the vehicle operator in a continuous analog display according to FIGS. 1-4. This feedback data thus provides the operator with the necessary information to make appropriate corrections to driving habit patterns and/or vehicle maintenance in order to maintain the vehicle performance at its rated fuel economy. It follows that the basic fuel economy indication 24A, the optional discrete data counters 32, 33, 75, 76 and 77 together with the vehicle rating matrix of FIG. 8 provide an effective energy conservation management program.

RESETTING THE MECHANISM

The resetting of the mechanism to a zero position will occur in association with the replenishment of fuel in the fuel storage tank (not shown). In the simplest functioning embodiment of this invention, as best seen in FIG. 3, the sector 16 will automatically reset simultaneously with the fuel tank filling. Sector 8 can be reset to zero manually be reset means 37 or 26A. In FIG. 4, however, an electromechanical device 53 is shown for restoring the distance traveled registration means 51 to a zero position corresponding to fuel tank fill up. Furthermore, device 53 can also provide proportional reset corresponding to partial fuel tank filling operations. It is instructive to teach that in FIG. 3 a corresponding electromagnetic reset device 18B can be applied to transmission element 7 with appropriate reset control signals from fuel measuring input device 18 and 18A.

MEMORY RECORD

Another feature of this invention deals with the fuel economy memory recording chart 24 shown in FIGS. 1 and 3 (or chart 85 in FIG. 4).

It has been determined that it is more desirable to support the chart 24 between a feed roll 23 on one side of the device 100 and a winding roll 25 on the opposite side of fuel economy indicator scale 21 with memory chart 24 being supported between these two rolls. In FIG. 4 a corresponding feed roll 86 and winding roll 84 are shown with a length of memory chart 85 being supported between these two rolls in suitable guides (not shown) so that the chart 85 is held in accurate alignment with fuel economy scale 64. The remainder of this description will apply to FIG. 4 but is equally applicable to the corresponding elements in FIG. 3. There are three fundamentally acceptable techniques for operatively engaging the memory chart to invention 100. Technique one includes housing 87 with viewing window 87A and chart roll mounting means 87E, 87F, 87G and 87H plus optional guide member 87D. Housing 87 being hinged to dial face 90 at hinge element 88 and releasably supported at latch 89. The memory chart 85 being inserted and removed from housing 87 when in the open position. Technique number two structurally supports the chart rolls 84 and 86 onto dial face 90 with housing 87 serving simply as a protective cover and viewing window. Technique number three provides the chart 85 together with rolls 84 and 85 in a self contained cartridge having the center portion substantially open for viewing one one side and recording on the opposite. The exterior geometry of the cartridge conforming to the geometry as shown. Supporting elements (not shown) hold the cartridge, comprised of referenced numerals 84, 85 and 86, stationary with dial face 90. Chart feed drive means 80, 82 and 83 are integral with invention 100 with reset knob 82A for use during diagnostic analysis. Element 83 is provided with a one way clutch 83A thereby allowing trip miles reset knob 78 to be utilized without disturbing the memory chart. Housing 87 is not necessarily required using this installation technique. There is shown on memory chart 85 the fuel economy pattern record 24B imprinted thereon. It was previously discussed that recording member 24E of FIG. 5 could be positioned to record on the front face of chart 85 in which situation the fuel economy indicator means 54 is located on the face side of dial 90 thereby requiring guide element 87D to cooperate with recording member 24E. Inkless recording methods, such as heated stylus 24F, provides an extremely reliable means with trouble free service. While not shown on the illustration it is instructive to teach that the fuel economy indicator 54 may be adapted to provide a combination record of fuel economy driving speed versus time pattern and cold vehicle starts. This is accomplished by causing the writing element 24F to be energized momentarily by a stroke action effectuated from the speedometer instrument 1 and speed indicator arm 40. Using mechanical or electromechanical means (not shown) the speed indicator arm 40 introduces a small momentary lateral deflection signal into fuel economy indicator means 54 thereby causing the recording element to move off its continuous line 24B momentarily. Thus when the memory chart 85 is analyzed it is apparent when an event has occurred and how frequently. The introduction of this signal is predetermined to correspond with a given vehicle speed associated with speed versus time driving pattern or in other words how many times has the vehicle been accelerated and decelerated thru a predetermined speed. When the vehicle ignition is turned off the fuel consumed measuring means elements 61, 18 and 57 are de-energized and therefore move to their respective off positions causing recorder means 24F to record this event. Thus the single recording means 24F may be adapted to provide three fundamentally related and significantly important fuel economy factors. Namely, miles per gallon, vehicle cold starts, time versus speed driving pattern. It is of interest to also observe that fuel economy memory record 24B shown in FIGS. 1 and 4, can exhibit small perturbations (not shown) about a mean value for 24B. These perturbations resulting from vehicle inertia changes and subsequent changes in fuel vessel liquid level. Therefore a city driving signature will as an inherent consequence be superimposed upon the fuel economy record 24B clearly correlating fuel economy record 24B with corresponding type of driving pattern. Appropriate selection of chart 24C feed speed, relative to measuring characteristics of fuel consumed measuring means 18, will produce a memory chart record 24B having a variety of "signature" styles. For instance the "signature" style could be a wide band type record during city driving and relative narrow or single line signature type during stable highway driving. The bold wide band contrasting sharply with the single line thereby providing a valuable record of not only fuel economy 24A but also type of driving pattern concurrent therewith.

GEOMETRIC CONFIGURATION

The construction of invention 100, as appearing in the illustrative embodiments of FIGS. 3 and 4 includes a speedometer instrument 1 and a fuel consumed measuring means 18 each operatively engageable with its respective computing elements 8, 12, 16, 50, 54 and 57 through appropriate means previously described. These elements being further cooperably engageable with graduated indicating scales 20, 21, 22, 66, 65 and 64 on a dial face 90. The memory recording chart 24 and 85 being operably engageable with both the dial face 90 and recording element 24E together with optional discrete data counters 73, 74, 75, 76 and 77 provide an integrated instrument cluster for mounting with instrument panel 38. It is important to recognize that elements designated by reference numerals 87, 85, 75, 76 and 77 are optional features of the present invention 100.

As illustrated the size D, E, F, G, H, I, J, K and geometry of invention 100 is related to both the computational techniques of FIGS. 6 and 7 together with the basic geometry configuration of vehicle instrument panel 38.

Of incidental interest is a dial face 90 orientation for scale 64 relative to scales 65 and 66 when the input distance traveled and fuel consumed movement elements 50, 57, 8 and 16 generate logarithmic scale data. Under this situation scale 64 in FIG. 4 may be paralled with scales 65 and 66. In FIG. 3 scale 21 may be paralled with cords formed with scales 20 and 22. These cords are best illustrated in FIG. 6 by a straight line through B1–B2 and C1–C2 where arcs B and C correspond to scales 20 and 22 respectively.

ENERGY CONSERVATION MANAGEMENT PROGRAM

In the discussion with respect to the process of utilizing the subject invention 100 for an energy conservation management program details were set forth for optional discrete data counters 75, 76 and 77 together with a fuel economy rating matrix in FIG. 8. The typical state vehicle safety inspection procedure includes features whereby vehicles are classified according to the manufacture make and class thereby allowing computer analysis of vehicle braking during the inspection. In addition to the conventional items inspected such as lights, steering, wipers, tires, horn and exhaust system there are other related items such as emission control, noise level and insurance. The subject invention 100 makes it possible to introduce the inspection of vehicle fuel economy in a simple and effective manner. Since odometer readings are recorded during inspection it is expedient to also record fuel consumed thereby providing a simple check of average fuel economy. A visual inspection could also be made of recorded fuel economy 24B. Vehicles with an actual observed fuel economy below specified limits relative to rated economy would require corrective action. This management program would provide an effective means of continuous assessment of vehicle energy conservation at the state vehicle inspection station thereby providing recorded data for reporting to the federal government as related to federal road funds. An interesting aspect of this program is that the organizational mechanism for administration already exists and would entail only a simple additional inspector item no more complicated than the inspection of brakes or lights. It is a program with effective management feature providing continuous on-going monitoring of actual on the road vehicle fuel economy performance. Various levels of sophistication can be obtained. For instance, the inspection station computer would have in its data bank a fuel energy rating matrix similar to FIG. 8 for each class of vehicle. Upon recording the discrete data appearing on subject invention 100 the computer analysis can provide diagnostic output as to the status of fuel economy and the suspected source of trouble should the actual observed performance occur outside specified limits relative to the manufacturer's rated fuel economy. Thus the subject invention 100 puts the vehicle operator in the energy conservation control loop by providing the necessary continuous feedback performance data. The rating matrix of FIG. 8 together with the existing vehicle inspection system provides the administrative and management features for an effective energy conservation program whereby all interested parties benefit. Therefore, how is the question, who's to blame for fuel economy ratings that rarely seem to agree with actual on the road performance, best answered? The operator or maintenance personnel locate data points in the rating matrix of FIG. 6 thereby clearly establishing the responsibility with no misunderstandings. It is interesting to note that the Federal Transportation Department is considering a proposal for reducing a state's federal highway fund allotment by up to 10 percent if it fails to meet a prescribed percentage compliance with the 55 mile per hour speed limit.

The objective being energy conservation. Furthermore, HR 6831 "The National Energy Act" proposed by President Carter, included among other items a fuel inefficiency tax and a fuel efficiency rebate as incentives for achieving energy conservation. The subject invention 100 utilized with the previously described energy conservation management program combined with the established state vehicle inspection procedure for monitoring will provide a simple and effective conservation procedure.

OPERATOR HORSEPOWER DEMAND COUNTER

In the early portions of this description it was mentioned that the counter 76, shown in FIGS. 1, 2 and 4, provides a memory device means for totalizing or accumulating a discrete measurement of the vehicle operator's behavior pattern at the vehicle accelerator. In terms of fuel economy, as effected by operator's driving habits, the most effective parameter to monitor is the behavior pattern as reflected at the vehicle accelerator which is the direct command link between the operator and the vehicle power plant. This parameter has been appropriately named the operator horsepower hour demand counter 76. The physical quantity being measured is the operator's demand for vehicle performance in terms of horsepower or torque both being related to the power delivered at the drive wheels thereby causing a definite speed versus time pattern of motion which in turn has a definite effect upon fuel economy.

Therefore, while this measurand is not a true measure of horsepower in precise engineering terms, it is most definitely a measure of the operator's demand for power plant performance in terms of horsepower. Counter 76 is an electromechanical transducer which responds to the measurand and produces a corresponding electrical signal that controls the counter 76 speed of rotation. The speed of rotation for counter 76 being proportioned to circuit power and where the total angular displacement is a measure of the time integral of power. The circuit power being varied in response to the operator's action on the vehicle accelerator. In the rating matrix of FIG. 8 there is tabulated among other parameters, the vehicle rated horsepower demand hours per mile in column 2 for the various fuel economy ratings in column 1. The rating matrix of FIG. 8 having data which was determined during a prescribed road test procedure similar to SAE J1082 fuel economy measurement-road test procedure.

The actual measured operator demand horsepower hours per mile determined by dividing the reading on counter 76 by the reading on counter 74 or 75 as the case may be. The actual measured operator demanded horsepower hours per mile thus determined can be compared with the rating matrix thereby revealing if the vehicle operator's driving habit pattern is conducive to fuel economy or if the problem relates to maintenance. It has been pointed out that one of the objects of this invention 100 was to provide an energy conservation indicating device in an energy conservation management program. Such a process in one form is shown in FIGS. 1 through 8 together with the descriptions set forth herein.

A POSITIVE EDUCATIONAL DEVICE

There are four categories of special interest involved in the matter of energy conservation as it relates to motor vehicles: (1) The U.S. government as the representative of the people providing for the general welfare, (2) the individual as a consumer and operator of motor vehicles, (3) the manufacturer for motor vehicles, (4) state governments as builders and regulators of both the construction and safety for the motor vehicle highway system. This invention described as a device 100 built and utilized in accordance with the embodiments set forth herein will provide the means whereby energy is conserved simultaneously with satisfying the special interest of each group noted above. These respective special interest are: (1) conservation of energy as a national resource in the interest of the general welfare, (2) economy of vehicle operation, (3) satisfaction for consumer plus compliance with energy conservation laws, (4) utilization of established state vehicle safety inspection organizations for monitoring as a means of meeting the transportation departments requirements for state's federal highway fund allotments.

Referring to the drawings and more particularly to FIGS. 1 and 8 a vehicle fuel economy and energy conservation indicating device 100 is illustrated. Observe that four basic elements of operator vehicle control are provided: (1) reference designation 2 provides an indication of vehicle speed, (2) reference designations 24A and 24B provide an indication of fuel economy, (3) reference designations 32, 33, 75, 76 and 77 provide discrete data storage for trip miles, total miles, fuel consumed, operator horsepower hours demanded, time versus speed driving pattern and manufacturers rating matrix of FIG. 8. Thus the combined effect of this integrated vehicle fuel economy device 100 is to motivate the operator to achieve fuel economy, provide a means for monitoring and provide a means for establishing responsibility for achieving rated fuel economy. Therefore, the subject invention 100 is a device that each special interest group can live with.

It should be understood that many features can be added to the subject invention 100 to increase its marketability, consequently I do not wish to be limited to the specific illustrative embodiments herein describe except as may appear in the appended claims. The features of my invention manifestly afford considerable latitude in their application and as it will be apparent to those skilled in the art, the invention described may be used in other specific forms without departing from its spirit or essential characteristics. The present embodiment is, therefore, to be considered as illustrative and not restrictive, the scope of the invention being indicated by the claims rather than by the foregoing description, and all changes which come within the meaning and range of equivalence of the claims are therefore intended to be embraced therein.

What is claimed is:

1. A vehicle fuel economy and energy conservation indicating device comprising in combination a first and second concentrically disposed generally parallel positioned cooperable computing elements rotating about a common axis, a third computing element operatively connected to each of said first and second computing elements, said operative connections providing generally oppositely disposed pivotal means between said first and second computing elements and said third computing element, said operative connections providing independent translative movement to said oppositely disposed pivotal means, calibrated graphic display scales embodied on the face surface of said device, said face surface juxtapositioned parallel to said computing elements, registering means provided on said face surface adjacent to said scales thereby allowing simultaneous viewing of said elements with said scales, the consequential operation of said first and second computing element together with said third computing element relate to said calibrated scales according to a mathematical relationship for vehicle fuel economy thereby indicating the average miles per gallon at any related total trip distance and total fuel consumed setting.

2. A vehicle fuel economy and energy conservation indicating device of the class described comprising in combination a first functional movement element operably driven by a fuel consumed measuring means transforming electrical inputs to rotary translation motion representative of total fuel consumed, second functional movement element operably driven by a connection to an odometer drive means representative of total distance traveled, said first and second functional movement elements concentrically disposed in a generally parallel position, a third functional movement element operatively connected to pivotal means circumferentially located on each of said first and second functional movement elements, said operative connection providing generally oppositely disposed pivotal means between said movement elements, said third functional movement element functionally communicated between said pivotal means, calibrated graphic scales embodied on the face surface of said device and juxtapositioned parallel to said functional movement elements, a first and second scale oppositely disposed and functionally located with respect to each of said first and second movement elements, said first scale calibrated for fuel consumed and said second scale calibrated for distance traveled, a third scale diagonally disposed between said first and second scales and calibrated to read average miles per gallon or the equivalent, the consequential operation of said movement elements relate to said calibrated scales according to a mathematical relationship for vehicle fuel economy thereby indicating the miles per gallon at any related trip distance and fuel consumed setting.

3. The device of claim 1 wherein said first and second computing elements are rotatably mounted on concentric pivot axis with said first and second computing elements independently driven by sector gears disposed circumferentially therewith, said sector gears independently driven by respectively a fuel consumed measuring means and a connection to an odometer, said sector gears generally oppositely disposed relative to said pivotal means.

4. The device of claim 1 including means for selectably detecting a plurality of vehicle performance related operating conditions comprising first means for totalizing the vehicle operator's demand for horsepower in terms of horsepower or torque both being related to the power delivered at the vehicle drive wheels causing a definite speed versus time pattern of motion which thereby relates to vehicle fuel economy, said first means receiving input signals in response to vehicle accelerator movement, means coupled to said first means for indicating the horsepower demand hours, said indication directly related to vehicle operating conditions, second means for registering and storing a signal representative of the frequency at which the vehicle accelerates or deaccelerates through a discrete speed, said first and second means continuously counting said vehicle operating conditions for display on counters disposed generaly circumferentially to said computing elements.

5. A device for a vehicle having distance traveled and fuel consumed measuring means, an analog fuel economy indicating means comprising means including a first total fuel consumed registering means operatively connected to said fuel consumed measuring means, a second total distance traveled registering means generally diaometrically disposed from said first registering means, said analog fuel economy indicating means operatively connected to each of said registering means, said operative connections causing oppositely disposed termini of said fuel economy indicating means to be translated in opposite directions, calibrated display scales embodied on the face surface of said device, one of said scales diagonally disposed and calibrated to read average miles per gallon or the equivalent, the consequential operation of said registering means together with said analog fuel economy indicating means relate to said calibrated scales according to a mathematical relationship for average vehicle fuel economy thereby registering the miles per gallon at any related total trip distance and total fuel consumed registeration.

6. A calculating device for a vehicle having analog total distance traveled per total units of fuel consumed calculating device comprising cooperable registering means, drive means operated by a total fuel consumed measuring means, a connection to an odometer drive means for measuring total distance traveled, a pair of functional movement elements concentrically located for angular rotation in opposite directions about a common pivot axis, a fuel economy indicating means functionally communicated between a pair of independent pivotal means located generally diaometrically disposed on outer circumference of said functional movement elements, said elements and indicating means mutually aligned in a predetermined relationship relative to a fixed average fuel economy registeration scale embodied on the face surface of said device, said face surface juxtapositioned parallel to said functional movement elements and related thereto according to a mathematical relationship for vehicle average fuel economy thereby indicating the total miles per gallon at any related total trip distance and total fuel consumed status.

7. In a ratio indicating device of the class described, the combination of a vehicle average fuel economy indicating means pivotally carried at oppositely disposed termini on respective pivotal means, said pivotal means disposed generally diaometrically opposed at outer periphery respectively of a pair of functional movement elements rotatably mounted for of angular rotation about a common concentric axis, means comprising a connection to an odometer drive means for applying first translative motion to first of said functional movement elements, said first motion representative of total distance traveled, means comprising a connection to a drive means operated by a fuel consumed measuring means for applying second translative motion to second of said functional movement elements, said second motion representative of total fuel consumed, a face surface juxtapositioned parallel to said functional movement elements and embodied therein with graphic display scales calibrated according to a mathematical relationship for vehicle average fuel economy equals total distance traveled divided by total fuel consumed, the consequential operation of said functional movement elements together with said indicating means relative to said calibrated scales causing average miles per gallon at any related trip distance and fuel consumed setting to be computed and indicated on said graphic display scale.

8. In an instrument of the class described for indicating the mathematical functional relationship between three variables F(x) equals F(y) divided by F(z), the combination of a first functional movement sector gear structure rotatable about a common axis concentric with a second funtional movement sector gear structure, said first structure operably connected to a odometer drive means representing F(y) as total distance traveled, said second structure operably connected to a fuel consumed drive means representing F(z) as total fuel consumed, average fuel economy indicating means representing F(x) and communicating between pivotal means generally diaometrically disposed at circumferentially opposed locations on said structures, said operative connection providing independent movement respectively in opposite directions to each of the oppositely disposed pivotal means, calibrated graphic display scales embodied on a dial face of said instrument, said dial juxtapositioned parallel with and in front of said sector gear structures, the consequential operation of said oppositely disposed pivotal means together with said average fuel economy indicating means relate to said calibrated scales according to a functional relationship of for vehicle average fuel economy equals total distance traveled divided by total fuel consumed.

9. An analog device for computing and indicating total distance traveled per total units of fuel consumed by a vehicle power plant, comprising: first total fuel consumed movement element operated by a fuel consumed measuring means; second total distance traveled movement element connected to an odometer drive means; a pair of cooperable pivotal means generally diaometrically disposed at circumferentially opposed positions on said movement elements; an alignment indicator member operatively connected to each of said cooperable pivotal means and communicated therebetween; said operative connections providing independent movement in opposite directions to each of said pivotal means; calibrated graphic display scales embodied on the face surface of said device; said face surface juxtapositioned parallel to said movement elements and provided with registering means for viewing said movement elements and alignment member in conjunction with said scales; one of said scales diagonally disposed between oppositely related zero positions for respectively distance traveled and fuel consumed and calibrated to read average miles per gallon or the equivalent, the consequential operation of said movement elements together with said alignment member relate to said calibrated scales according to a mathematical relationship for vehicle average fuel economy thereby indicating the miles per gallon at any related total trip distance and total fuel consumed setting.

10. A method for computing and displaying the total distance traveled per total units of fuel consumed by a vehicle power plant comprising the steps of:
 a. positioning a pair of cooperable parallel sector gear computing elements concentrically relative to a common rotation axis so that each of said elements has a generally diaometrically disposed pivotal means located at circumferentially opposed positions on said elements, and
 b. communicating an alignment member between oppositely disposed pivotal means the termini of which provide an operative connection with said pivotal means such that a straight line intersecting the oppositely disposed geometric centers uniquely establishes the location of a fuel economy indicating means, and
 c. positioning calibrated graphic display scales parallel with said computing elements and said alignment member according to a mathematical relationship for vehicle average fuel economy, and
 d. positioning a first and second scale oppositely disposed and functionally located with respect to each of said computing elements, and
 e. calibrating said first scale for total distance traveled and said second scale calibrated for total fuel consumed, and
 f. calibrating a third diagonally disposed scale between said first and second scales to read average miles per gallon or the equivalent, and
 g. providing observation means on said display scales to allow simultaneous viewing of the registration with said scales, and
 h. operating said computing elements such that the consequential independent movement of said oppositely disposed pivotal means causes said alignment member to indicate the average miles per gallon at any related total trip distance and total fuel consumed setting.

11. The method of claim 10 further comprising the steps of:
 a. positioning a memory recording chart including base means supporting first and second spindles for respectively receiving supply and take up spools containing a memory chart rotatable mounted therebetween, and
 b. releasable connecting one of said chart spools to an odometer drive means as a source of chart motion, and
 c. adapting said alignment member with a writing element so as to cause a record of fuel economy to appear on said memory chart, and
 d. operating said memory recording chart simultaneously with the consequential operation of said cooperable computing elements all relative to said calibrated scales thereby causing said writing element to record said fuel economy upon said chart thus providing a short time signature trace for continuous viewing and a long time record for subsequent analysis.

12. In a device of the class described for indicating vehicle average fuel economy, the combination comprising: a pair of parallel concentrically positioned sector gear computing elements rotatable about a common axis; two independent cooperable pivotal means generally diametrically disposed at circumferentially opposed locations on said computing elements; an alignment indicator member operatively connected at opposite termini to each of said pivotal means; said operative connection providing pivotal mounting means between said pivotal means and said alignment member; said operative connection providing independent movement to each of the circumferentially opposed pivotal means; calibrated graphic display scales embodied on the face surface of said device; said face surface juxtapositioned parallel to said computing elements; a first and second scale oppositely disposed and functionally located with respect to each of said cooperable pivotal means; said first scale calibrated for total distance traveled and said second scale calibrated for total fuel consumed; a third scale diagonally disposed between said first and second scales and calibrated to read average miles per gallon or the equivalent; registering means provided on said face surface adjacent to said scales thereby allowing simultaneous viewing of said computing elements and alignment member with said scales; the consequential operation of said computing elements together with said alignment member all relative to said calibrated scales according to a mathematical relationship for vehicle average fuel economy thereby indicating the average miles per gallon, or its equivalent, at any related total trip distance and total fuel consumed setting.

* * * * *